(12) United States Patent
Lenning et al.

(10) Patent No.: US 7,735,859 B2
(45) Date of Patent: Jun. 15, 2010

(54) SAFETY ARRANGEMENT FOR USE IN A MOTOR VEHICLE

(75) Inventors: Anders Lenning, Kungsbacka (SE); Mikael Dahlgren, Alingsås (SE)

(73) Assignee: Autoliv Development AB, Vargarda (SE)

( * ) Notice: Subject to any disclaimer, the term of this patent is extended or adjusted under 35 U.S.C. 154(b) by 228 days.

(21) Appl. No.: 11/658,070

(22) PCT Filed: Jul. 1, 2005

(86) PCT No.: PCT/SE2005/001054

§ 371 (c)(1), (2), (4) Date: Mar. 18, 2008

(87) PCT Pub. No.: WO2006/009500

PCT Pub. Date: Jan. 26, 2006

(65) Prior Publication Data

US 2008/0258443 A1 Oct. 23, 2008

(30) Foreign Application Priority Data

Jul. 22, 2004 (GB) ................................. 0416388.7

(51) Int. Cl.
*B60R 21/16* (2006.01)
(52) U.S. Cl. .................. 280/735; 280/739; 280/737; 180/268; 180/274; 180/282
(58) Field of Classification Search ................ 280/735, 280/737, 739; 180/268, 274, 282
See application file for complete search history.

(56) References Cited

U.S. PATENT DOCUMENTS

| | | | |
|---|---|---|---|
| 5,413,378 A | 5/1995 | Steffens, Jr. et al. | |
| 5,626,359 A * | 5/1997 | Steffens et al. | 280/735 |
| 5,664,802 A * | 9/1997 | Harris et al. | 280/736 |
| 5,670,853 A * | 9/1997 | Bauer | 318/286 |
| 5,743,558 A * | 4/1998 | Seymour | 280/739 |
| 5,765,774 A * | 6/1998 | Maekawa et al. | 242/390.9 |
| 5,927,753 A * | 7/1999 | Faigle et al. | 280/735 |
| 5,947,514 A * | 9/1999 | Keller et al. | 280/742 |
| 6,145,878 A | 11/2000 | Weikl | |
| 6,188,940 B1 * | 2/2001 | Blackburn et al. | 701/45 |
| 6,290,159 B1 * | 9/2001 | Specht et al. | 242/379.1 |
| 6,598,900 B2 * | 7/2003 | Stanley et al. | 280/735 |

(Continued)

FOREIGN PATENT DOCUMENTS

EP 0 656 283 11/1994

(Continued)

*Primary Examiner*—Paul N Dickson
*Assistant Examiner*—Jordan Golomb
(74) *Attorney, Agent, or Firm*—Brinks Hofer Gilson & Lione

(57) ABSTRACT

A safety arrangement to provide protection for an occupant in a motor vehicle includes a seat-belt provided with a measuring device to measure energy absorbed by the seat-belt. The measuring device may determine the length of safety-belt paid-out after a retractor locks, the belt being paid-out against a force provided by a force-limiter. The energy absorbed is calculated and is used to control the vents of a ventable air-bag. The air-bag is vented if a substantial part of the energy of the occupant is absorbed by the seat-belt, but is not vented if a large proportion of the energy has not been absorbed by the seat-belt.

9 Claims, 1 Drawing Sheet

U.S. PATENT DOCUMENTS

| | | |
|---|---|---|
| 6,874,819 B2 * | 4/2005 | O'Neill ........................ 280/805 |
| 6,932,384 B2 | 8/2005 | Waid et al. |
| 2003/0025309 A1 * | 2/2003 | Schenck et al. ............. 280/735 |
| 2003/0094327 A1 * | 5/2003 | Specht ........................ 180/268 |
| 2004/0051286 A1 | 3/2004 | Fischer et al. |
| 2005/0114108 A1 * | 5/2005 | Cooper et al. .................. 703/8 |
| 2006/0255574 A1 * | 11/2006 | Ingemarsson et al. ....... 280/735 |

FOREIGN PATENT DOCUMENTS

| | | |
|---|---|---|
| EP | 1 356 998 | 4/2003 |
| WO | WO01/00454 A1 * | 1/2001 |
| WO | WO 01/17825 | 3/2001 |
| WO | WO02/26531 A2 * | 4/2002 |

* cited by examiner

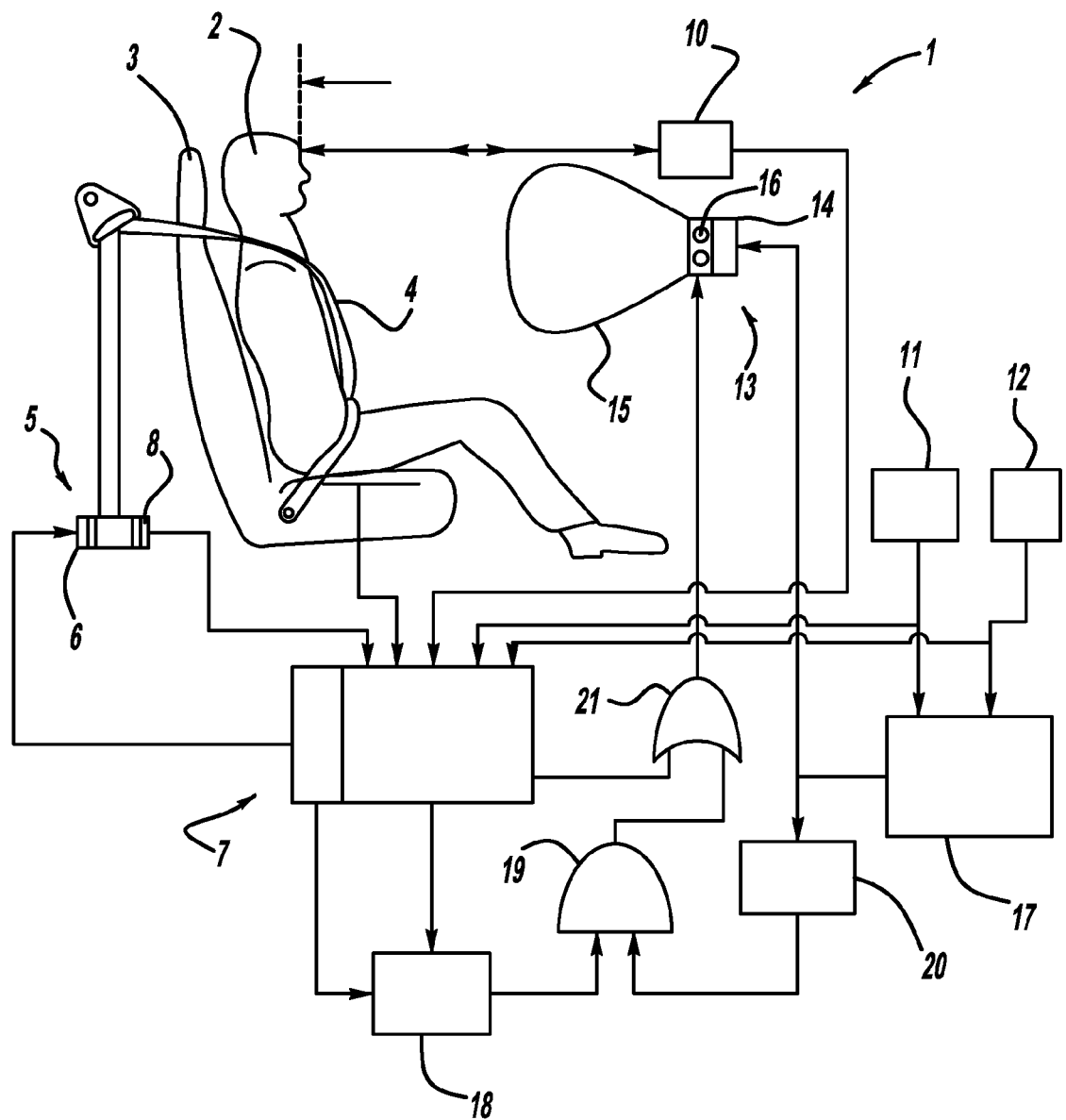

SAFETY ARRANGEMENT FOR USE IN A MOTOR VEHICLE

CROSS REFERENCE TO RELATED APPLICATIONS

This application claims priority to GB 0416388.7 filed Jul. 22, 2004 and PCT/SE2005/001054 filed Jul. 1, 2005.

FIELD OF THE INVENTION

The present invention relates to a safety arrangement, and more particularly relates to a safety arrangement for use in a motor vehicle.

BACKGROUND OF THE INVENTION

Conventional safety arrangements for motor vehicles incorporate a safety-belt and an air-bag to restrain an occupant during a crash situation. The main aim of such conventional safety arrangements is to absorb the kinetic energy of an occupant, when the occupant moves relative to the vehicle as a consequence of inertia or momentum during a crash situation, to prevent the occupant from hitting a solid part of the vehicle. In this way the risk of injury may be reduced. If the kinetic energy of a vehicle occupant can be successfully dissipated, this may prevent the occupant from striking part of the vehicle at speed and possibly facing injury.

The kinetic energy of a vehicle occupant that is to be absorbed is dependent upon the weight of the occupant and the speed at which the occupant moves relative to the vehicle, as the vehicle is decelerated. It is important for a safety arrangement to absorb all of the kinetic energy of a vehicle occupant during a crash situation, so that risk of injury to the occupant may be minimized. It is also important that the safety arrangement does not restrain a seat occupant excessively during an accident situation, as this may itself injure the seat occupant.

Therefore, for a safety arrangement which incorporates a safety-belt and an air-bag, it would be ideal for the total energy which is absorbed by the combination of the safety-belt and the air-bag in any crash situation to be matched to the kinetic energy of an occupant in the crash situation.

The present invention seeks to provide an improved safety arrangement.

SUMMARY OF THE INVENTION

According to this invention there is provided a safety arrangement for use in a motor vehicle, the arrangement incorporating a safety-belt and an air-bag which is ventable in response to a control signal, wherein there is an energy measuring device for measuring the energy absorbed through the safety-belt as an occupant of the vehicle moves against the safety-belt during an accident situation, and an arrangement to generate the control signal in dependence upon the measured level of energy absorbed.

In at least one embodiment, the arrangement includes a comparator to compare the measured energy absorbed by the safety-belt with a predetermined threshold and to produce the control signal to vent the air-bag if the energy absorbed by the safety-belt is greater than the predetermined threshold.

The threshold may be determined by a processor responsive to the predicted or actual crash event, and/or the position of a vehicle occupant, and/or the weight of a vehicle occupant.

In at least one other embodiment, the arrangement incorporates a retractor for the safety-belt, the retractor being associated with an energy absorbing device which absorbs energy as the occupant moves against the safety-belt during the accident situation, the energy measuring device measuring the energy absorbed by the energy absorbing device.

The energy absorbing device may be an adaptable load-limiter which provides a selected energy absorbing resistance during the accident situation.

The adaptable load-limiter may provide the selected energy absorbing resistance in response to one or more parameters which represent the severity of the accident, the position of the occupant, or the weight of the occupant.

In at least one embodiment, the retractor incorporates a spool onto which the safety-belt is wound, and the energy absorbing device absorbs energy on rotation of the spool after locking of the retractor, and the retractor includes an angle measurement device to measure the angle of rotation of the spool as the safety-belt is paid out from the retractor after locking of the retractor to measure the energy absorbed.

The arrangement may include a crash algorithm unit to determine whether an accident situation is occurring and produce a trigger signal to inflate the air-bag, there being a timer to time to an instant which is a pre-determined time after the trigger signal is passed to the air-bag and produce a timer signal which is indicative of the air-bag being fully inflated, the control signal being passed to the air-bag when the timer signal is generated.

The arrangement may incorporate a position sensor for measuring the position of the occupant relative to the front of the cabin of the vehicle and produce a signal which is input into the control unit, the position sensor being configured to determine if the occupant is out of position, and the control unit being configured to determine if the occupant is out of position and the control unit being configured to produce a signal to vent the air-bag if the position sensor produces a signal which indicates that the occupant is out of position.

It is to be understood that in embodiments of the invention, the variable vent may be a variable vent of the type which either provides venting or provides no venting. However, equally a multi-stage or continuously variable venting arrangement could be utilized. In such a situation the venting provided in any specific accident situation may be selected, adjusted and controlled to be ideally appropriate for that specific crash situation.

In the preferred embodiment of the invention, it is to be appreciated that the degree of venting provided is appropriate for the severity of the accident, taking into account all of the relevant parameters including taking into account the amount of energy absorbed by the safety-belt.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a schematic view of a safety arrangement in accordance with an embodiment of the present invention.

DETAILED DESCRIPTION

Referring to FIG. 1, a safety arrangement 1 is installed within a vehicle to protect an occupant 2 in the event that an accident occurs. The vehicle is provided with a seat 3 for the occupant 2. A safety-belt 4 is associated with the seat 3. In this embodiment, the safety-belt 4 is a three-point belt. The arrangement incorporates a retractor 5 which the safety-belt 4 may be wound into or paid-out from. The retractor 5 incorporates an adaptable load-limiter 6, which may be used, in the event that an accident occurs, to provide a selected energy absorbing resistance as the safety-belt 4 is paid-out from the retractor 5 after the retractor 5 has locked during the accident. The adaptable load-limiter 6 is controlled by a signal from a central control unit 7 which sets the energy absorbing resistance to be applied by the load-limiter 6. In a modified embodiment a constant load-limiter could be used.

The retractor 5 also incorporates an angle measurement device 8, which is used to measure the angle of rotation of a spool onto which the safety-belt 4 is wound, within the retractor 5. The angle measurement device 8, in this embodiment, measures the angle of the spool optically. Alternatively the angle may be measured magnetically with a magnet on the spool being sensed, for example, by a Hall effect device. The angle measurement device 8 produces a signal which is fed into an input of the central control unit 7. The signal is indicative of the length of belt 4 paid out by the retractor 5 after the retractor 5 has locked in an accident situation, that is to say, the length of belt 4 paid out while energy is absorbed by the load-limiter 6.

The safety arrangement 1 also incorporates a weight sensor 9, which is situated within the squab or seat cushion of the seat 3, for measuring the weight of the occupant 2, when the occupant 2 is seated on the seat 3. The weight sensor 9 produces a signal representative of the weight of the seat occupant 2 and the signal is fed into an input of the central control unit 7.

A position sensor 10 is mounted in the vehicle to measure the position of the seat occupant 2. The position sensor 10 may be, for example, an ultrasonic sensor or an optical sensor, and is provided to determine the distance between the occupant 2 and the front of the vehicle cabin. The sensor 10 may be mounted on the A-Post (or "A-Pillar") of the vehicle, above the windscreen or any other suitable position. Thus the sensor 10 can be used to determines if the occupant is leaning forwardly. The position sensor 10 provides a signal representative of the position of the occupant 2 to the control unit 7.

The safety arrangement 1 may also include a radar sensor 11 which is mounted to part of the vehicle to detect an object that the vehicle may collide with, and to determine the relative speed of the vehicle and the object. The radar sensor 11 may be a type which operates according to the Doppler shift principle, and may be used to predict whether the vehicle is about to be involved in a collision, if the collision is with another moving vehicle, and how severe the collision is likely to be. The radar sensor 11 is thus a sensor which senses a potential impact, and which may also determine the probable severity of the impact. The radar sensor 11 is connected to the control unit 7, so that the radar sensor 11 inputs a signal into the control unit 7 to indicate that an accident situation may be about to occur, and the control unit 7 may determine the anticipated severity of the accident.

The safety arrangement 1 may include an acceleration sensor 12 which is mounted to part of the vehicle, for instance the bumper or the chassis of the vehicle. The acceleration sensor 12 is able to measure changes in the acceleration, or deceleration of the vehicle, and may optimally be connected to the control unit 7 to transmit a signal to the control unit 7 which reflects the acceleration or deceleration of the vehicle. The acceleration sensor 12 acts as a sensor which senses when an accident is actually occurring, for example when the vehicle is decelerated very suddenly, due to a collision. As well as providing a signal that an accident situation is occurring, the acceleration sensor 12 may be able to monitor the acceleration or deceleration of the vehicle during the accident situation and thus monitor how the conditions of the accident situation change over time, and provide a continuous output representative of the instantaneous acceleration or deceleration of the sensor, thus providing a continuous indication of the severity of the accident.

The sensors described above are conventional sensors. Any other suitable sensors known to those skilled in the art may also be used.

The central control unit 7 may use signals from the sensors 8-12 to determine the potential or actual severity of the accident, and the weight of the occupant 2 to select the energy absorbing resistance which is to be applied by the load-limiter 6 to the safety-belt 4. The central control unit 7 sends a signal to the load-limiter 6 to set the energy absorbing resistance at a particular level depending upon the values from the sensors 8-12. In this embodiment, when the acceleration sensor 12 sends a signal to the central control unit 7 to indicate that an accident is occurring, the central control unit 7 monitors the signal from the weight sensor 9 and the signal from the acceleration sensor 12.

If the weight sensor 9 indicates that the occupant 2 is a light occupant, and the acceleration sensor 12 indicates that the accident is only a slow speed accident, the central control unit 7 is able to determine that the energy of the occupant 2 when the occupant 2 moves during the accident situation will be low. The central control unit 7 sends a signal to the load-limiter 6 to control the load-limiter 6 so that a small energy absorbing resistance is applied.

If the weight sensor 9 indicates that the occupant 2 is of medium weight, and the acceleration sensor 12 indicates that the speed of the accident is of average speed the central control unit 7 outputs a signal to the load-limiter 6 to control the load-limiter 6 so that only a medium level of energy absorbing resistance is applied to the safety-belt 4 via the load-limiter 6. Similarly, if the weight sensor 9 indicates that the occupant 2 is a heavy occupant, and the acceleration sensor 12 indicates that the accident is a high speed accident, the central control unit 7 sends a signal to the load-limiter 6 to control the load- limiter 6 so that a large energy absorbing resistance is applied to the safety-belt 4 by the load-limiter 6 to restrain the occupant 2.

It will be understood that the load-limiter 6 has a plurality of different energy absorbing resistances which it may apply to the safety-belt 4, with the amount of energy absorbing resistance being selected in response to the weight of the occupant 2 and the severity of the accident. In other embodiments the control unit 7 controls the energy absorbing resistance to be applied by the load-limiter 6 not only in response to the severity of the accident and the weight of the occupant 2, but also in response to the signal from the position sensor 10, to apply a different energy absorbing resistance depending upon whether the occupant 2 is out of position, for instance if the occupant 2 is leaning forwardly.

An air-bag unit 13 is mounted to a part of the vehicle which is in front of the occupant 2 when the occupant 2 is seated on the seat 3. The air-bag unit 13 has an inflator 14 and is a selectively ventable air-bag 15 which incorporates vents 16 that may be opened selectively in response to a venting signal.

The radar sensor 11 and the acceleration sensor 12 are connected to a processor which is a crash algorithm unit 17, and the crash algorithm unit 17 is configured to receive signals from the sensors 11, 12. The crash algorithm unit 17 analyses the signals from the radar sensor 11 and the acceleration sensor 12 to identify an accident situation, and if the crash algorithm unit 17 determines that it is appropriate to inflate the air-bag 15 to protect the occupant 2, the crash algorithm unit 17 produces an air-bag trigger signal which is fed to the inflator 14, to trigger the inflator 14 and inflate the air-bag 15. Typically the crash algorithm unit 17 may produce the trigger signal in response to predetermined signals from the radar sensor 11 and the acceleration sensor 12, or in response to a specific signal from the acceleration sensor 12.

The central control unit 7 incorporates a processor for processing the signals from the sensors 8-12 to produce a signal which defines a predetermined threshold, which is related to the energy of the occupant 2. In this embodiment the predetermined threshold will be calculated by the central control unit 7 at the time at which an accident occurs, as detected by the acceleration sensor 12.

In another embodiment the central control unit 7 calculates the predetermined threshold based upon signals from the weight sensor 9 and the position sensor 10, together with the radar sensor 11. This allows the predetermined threshold to be calculated before the accident situation occurs, with the severity of the accident being predicted by the radar sensor 11.

In yet another embodiment the predetermined threshold is calculated continuously, before and during the accident situation. In this embodiment the central control unit 7 uses the signal from the radar sensor 11 to calculate the predetermined threshold before the accident situation, and uses the signal from the acceleration sensor 12 as the accident situation occurs, to verify the calculated threshold, and even to vary the threshold as the accident is in progress, such as for example, if the vehicle is involved in a second impact that substantially accelerates the vehicle.

Thus it is possible for the central control unit 7 to calculate the predetermined threshold and vary its output in accordance with changing accident conditions. The central control unit 7 has an output for outputting a signal representing the predetermined threshold to a comparator 18. Typically the threshold is a fixed proportion of the calculated total energy to be absorbed, such as 65% of the energy to be absorbed.

As described above the central control unit 7 produces a signal which sets the resistance applied by the adaptable load-limiter 6. The central control unit 7 receives a signal from the angle measurement device 8 and determines the amount of safety-belt 4 which has been paid-out of the retractor 5 during an accident situation, and at what level of resistance. The central control unit 7 can thus calculate the amount of energy which is absorbed by the load-limiter 6 during the accident situation by multiplying the level of resistance with the length of the safety-belt 4 paid out. The central control unit 7 thus produces a signal which is representative of the amount of energy absorbed and outputs its signal to a second input of the comparator 18.

The comparator 18 compares the two signals representing the threshold value which is proportional to the total kinetic energy of the occupant 2 and the energy actually absorbed by the load-limiter. If the energy absorbed by the load-limiter 6 is greater than the threshold, then the comparator 18 produces a control signal which is fed into a first input of an AND-gate 19. This signal will, as will be described below, eventually cause the air-bag 15 to be vented so that the air-bag 15 is soft and does not injure the occupant 2.

The output of the crash algorithm unit 17 that carries the control signal is connected to an input of a timer 20. The timer 20 is configured to time a length of time after receipt of an input signal equivalent to the time taken for the inflator 14 to fully inflate the air-bag 15, and then to produce an output signal, or timer signal. Thus the timer signal is generated when the air-bag 15 is fully inflated. This signal is fed into a second input of the AND-gate 19.

The AND-gate 19 produces a signal on its output if the comparator 18 has produced an actuation signal at the time that the airbag 15 is fully inflated. The output from the AND-gate 19 is fed into a first input of an OR-gate 21. If the AND-gate 19 produces a signal on its output the OR-gate 21 also produces a signal on its output. The output from the OR-gate 21 is connected to a device for opening the vents 16 of the air-bag 15.

The central control unit 7 is also able to use the signals from the sensors 8-10 to determine a situation in which the air-bag 15 must be vented, despite the energy being absorbed by the load-limiter 6 being sufficient to be above the calculated predetermined level. Such a situation may occur if the occupant 2 is out of position and leaning forwardly, and is thus close to the air-bag unit 13. The central control unit 7 is able to detect this situation by monitoring the signal from the position sensor 10. If the position sensor 10 sends a signal which indicates that the occupant 2 is too close to the air-bag unit 13, the central control unit 7 produces a signal which is fed into a second input of the OR-gate 21. If this signal is present at the second input of the OR-gate 21, the output of the OR-gate 21 will activate the device for opening the vents 16. Thus if, for example, the occupant 2 is out of position the air-bag 15 will be vented.

During normal vehicle operation the air-bag 15 is uninflated, and the retractor 5 is unlocked. In the event that an accident occurs the acceleration sensor 12 and the radar sensor 11 send signals to the central control unit 7 and the crash algorithm unit 17, and each of the units 7, 17 processes the signals to determine how the safety arrangement 1 is to be deployed.

The central control unit 7 processes the signals from the weight sensor 9, the radar sensor 11 and the acceleration sensor 12 to determine the level of energy absorbing resistance which the load-limiter 6 should apply to the safety-belt 4 after the retractor 5 has locked. The central control unit 7 sends a signal to the adaptable load-limiter 6 which controls the load-limiter so that it provides the required energy absorbing resistance.

The crash algorithm unit 17 processes the signals from the radar sensor 11 and the acceleration sensor 12 to determine whether the air-bag 15 should be inflated to restrain the occupant 2. If the crash algorithm unit 17 determines that it is appropriate to inflate the air-bag 15, the crash algorithm unit 17 sends a trigger signal to the inflator 14 which inflates the air-bag 15. When the trigger signal is sent by the crash algorithm unit 17 the timer 20 is started.

While the air-bag 15 is being inflated, and the timer 20 is timing, the central control unit 7 calculates the pre-determined threshold by analyzing the signals from the sensors 9-12. The pre-determined threshold is related to the predicted kinetic energy of the occupant 2, as the occupant 2 is moved during the accident situation. The central control unit 7 transmits a signal to the comparator 18.

The central control unit 7 also monitors the signal from the angle measuring device 8, which is measuring the angle of rotation of the spool within the retractor 5 as the spool rotates after the retractor 5 has locked. The central control unit 7 uses this signal, together with the signal representing the level of energy absorbing resistance which was transmitted to the load-limiter 6, to determine the amount of energy which is being absorbed by the load-limiter 6 during the accident situation. The central control unit 7 transmits a signal to the comparator 18 which is indicative of the actual kinetic energy being absorbed by the load-limiter 6 during the accident.

The comparator 18 compares the signal representing the threshold value with the signal representing the actual energy absorbed by the load-limiter 6. If the comparator 18 determines that the energy absorbed by the load-limiter 6 is greater than the threshold value the comparator 18 sends a signal to the first input of the AND-gate 19. The signal is thus passed to the AND-gate 19 only when the safety-belt 4 has absorbed a substantial part of the energy of the occupant 2, and the occupant 2 will need a soft air-bag, rather than a hard air-bag.

The AND-gate 19 does not produce a signal on its output until the comparator 18 has input a signal into the AND-gate's first input, and the timer 20 has input a signal into the AND-gate's second input. When the timer 20 has timed a length of time after the actuation signal which is equivalent to the time taken for the air-bag 15 to become fully inflated, the timer 20 sends a signal to the second input of the AND-gate 19. At this point there is a signal present on each of the inputs to the AND-gate 19, and the AND-gate 19 produces an output control signal which is fed into the input of the OR-gate 21.

As there is now a signal present on one of the inputs to the OR-gate 21, the OR-gate 21 produces a control signal on its output which is transmitted to the device for opening the vents 16 in the air-bag 15. The air-bag 15 is thus vented, so that the occupant 2 is not overly restrained by the air-bag 15 and the energy which is absorbed by the safety arrangement 1 is matched to the kinetic energy of the occupant 2 in the accident situation.

In an alterative accident situation, if the comparator 18 does not determine that the energy absorbed by the load-limiter 6 is less than the threshold, that is to say the safety-belt 4 has not absorbed the required proportion of the total energy, then no signal is generated and the air-bag is not vented. The air-bag will be hard, (i.e. fully pressurized) and will be able to absorb the energy of the occupant 2.

It is to be understood that in the described embodiment of the invention the air-bag is vented if the energy absorbed by the seat-belt in a specific accident situation is in excess of the calculated threshold, but the air-bag is not vented if the energy absorbed is beneath the threshold. In other embodiments of the invention, there may be a variable vent, the specific degree of venting provided depending upon the absolute level of energy absorbed and the absolute level of the desired threshold, so that an ideal venting characteristic may be present in the air-bag when the occupant impacts with the air-bag.

If the occupant is sensed to be out of position, such as leaning forwardly, by the sensor 10 a signal will be provided to the OR-gate 21 which will cause the air-bag 15 to be vented at an early stage in its deployment in order to minimize the risk of the air-bag injuring the occupant 2.

While, in the described embodiment, discrete components such as comparators and logic gates are used, other suitable components known to those skilled in the art with similar functionality may be used, such as for example, a programmed processor.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A safety arrangement for an occupant positioned in a front cabin of a motor vehicle, wherein the safety arrangement includes a safety-belt and an air-bag which is ventable in response to a control signal, the safety arrangement comprising:

a measuring device including an angle measurement device cooperatively configured with a control unit for calculating energy absorbed via the safety-belt as the occupant of the vehicle moves against the safety-belt during an accident situation; and the control unit configured to generate the control signal in response to the calculated energy absorbed.

2. The safety arrangement according to claim 1, wherein the safety arrangement further comprises a comparator to compare the calculated energy absorbed by the safety-belt with a predetermined threshold and to cooperate with the control unit to generate the control signal for venting the air-bag when the calculated energy absorbed is greater than the predetermined threshold.

3. The safety arrangement according to claim 2, wherein the predetermined threshold is determined by the control unit in response to an input selected from a group consisting of a predicted crash violence, an actual crash violence, a position of the occupant, and a weight of the occupant.

4. The safety arrangement according to claim 1, wherein the safety arrangement includes a retractor for the safety-belt and an energy absorbing device, the retractor cooperating with the energy absorbing device to absorb energy as the occupant moves against the safety-belt during the accident situation, wherein the measuring device and the control unit cooperate to calculate the energy absorbed by the energy absorbing device.

5. The safety arrangement according to claim 4, wherein the energy absorbing device is an adaptable load-limiter which provides a selected energy absorbing resistance during the accident situation.

6. The safety arrangement according to claim 5, wherein the adaptable load-limiter provides the selected energy absorbing resistance in response to at least one input selected from a group consisting of a severity of the accident, a position of the occupant and a weight of the occupant.

7. The safety arrangement according to claim 4, wherein the retractor includes a spool onto which the safety-belt is wound, wherein the energy absorbing device absorbs energy on rotation of the spool after locking of the retractor, and the retractor further includes the angle measurement device for measuring the angle of rotation of the spool as the safety-belt is paid out from the retractor after locking of the retractor for determining the calculated energy absorbed.

8. The safety arrangement according to claim 1, wherein the safety arrangement includes a crash algorithm unit and a timer, wherein the crash algorithm unit determines when the accident situation is occurring and produces a trigger signal to inflate the air-bag and the timer times to a pre-determined time after the trigger signal is transmitted to the air-bag and generates a timer signal which indicates the air-bag is substantially inflated, wherein the control signal is transmitted to the air-bag when the timer signal is generated.

9. The safety arrangement according to claim 1, wherein the safety arrangement further comprises a position sensor, wherein the position sensor measures a position of the occupant relative to the front of the cabin of the vehicle and produces an input signal which is input into the control unit, wherein the position sensor is configured to determine if the occupant is out of position and the control unit is configured to produce the control signal for venting the air-bag when the position sensor generates the input signal indicating that the occupant is out of position.

* * * * *